United States Patent [19]

Doran et al.

[11] Patent Number: 5,131,751
[45] Date of Patent: Jul. 21, 1992

[54] RING LASER GYRO CAVITY LENGTH CONTROLLER, FRAME COMPRESSION

[75] Inventors: Robert A. Doran, East Setauket, N.Y.; Joseph P. Ficalora, Oak Ridge, N.J.

[73] Assignee: Allied-Signal Inc., Morris Township, Morris County, N.J.

[21] Appl. No.: 515,033

[22] Filed: Apr. 26, 1990

[51] Int. Cl.⁵ .............................................. G01C 19/66
[52] U.S. Cl. ...................................... 356/350; 372/94
[58] Field of Search ............................ 356/350; 372/94

[56] References Cited

U.S. PATENT DOCUMENTS

| | | | |
|---|---|---|---|
| 4,321,557 | 3/1982 | McNair | 356/350 |
| 4,386,853 | 6/1983 | Ljung | 356/350 |
| 4,678,335 | 7/1987 | Berg | 356/350 |
| 4,715,713 | 12/1987 | Hutchings | 356/350 |
| 4,733,966 | 3/1988 | Butler | 356/350 |
| 4,751,718 | 6/1988 | Hanse et al. | 356/350 |

Primary Examiner—Samuel Turner
Attorney, Agent, or Firm—Donald B. Paschburg; Howard G. Massung; Robert A. Walsh

[57] ABSTRACT

In a ring laser gyroscope a laser beam is directed to travel in a closed path, however, temperature variations can cause a change in the path length which, if not corrected, can result in drift and scale factor errors. The present invention controls the length of this closed path or cavity by applying a force to the gyro normal to the lasing plane. This is accomplished by inserting a bolt through the longitude axis of the gyro and by utilizing the bolt to apply or to relieve force therefore maintaining the cavity length constant over a given temperature range.

7 Claims, 5 Drawing Sheets

FIGURE 5

CAVITY LENGTH CONTROL SQUEEZE TYPE

| VARIABLE | VALUE | DESCRIPTION | Equation Number |
|---|---|---|---|
| α.tp* | 1.5E-05 | α Top Plate(in/in/°C) | |
| L.tp | 0.2864 | Length Top Plate(in) | |
| α.pzt* | 4E-06 | α PZT(in/in/°C) | |
| L.pzt | 0.120 | Length PZT(in) | |
| α.f | 0.268 | Area Frame(in^2) | |
| L.bolt | 1.1264 | Length Bolt(in) | |
| E.f | 950000 | FrameModulus(psi) | 1)Thermal Reaction(Lbf) = Pt = -0.13 = ((α.f*Δ.Temp*PL*α.f*E.f)/(L.f*PR)) |
| α.f* | -5E-08 | α Frame(in/in/°C) | |
| PL | 2.36 | Gyro Pathlength(in) | 2)tp(in) = 2.63E-06 = ((-(Pt)*L.tp)/(α.tp*E.tp)) + α.tp*Δ.Temp*L.tp |
| PR* | 0.240 | Poisson Ratio-Frame | |
| α.tp | 0.268 | Area Top Plate(in^2) | 3)f(in) = 2.77E-07 = (α.f*Δ.Temp*L.f)-((Pt)*(L.f))/(α.f*E.f) |
| α.pzt | 0.268 | Area PZT(in^2) | |
| α.bolt | 0.01227 | Area Bolt(in^2) | 4)pzt(in) = 5.82E-07 = (2*α.pzt*Δ.Temp*L.pzt)-(((Pt)*(L.pzt))/(α.pzt*E.pzt)) |
| E.bolt | 2.2E+07 | Bolt Modulus(psi) | |
| E.pzt | 1E+07 | PZT Modulus(psi) | 5)bolt(in) = 3.49E-06 = Δ.tp + Δ.f + Δ.pzt |
| E.tp* | 2.8E+07 | Top Plate Modulus | |
| Δ.Temp | 0.60 | Temp. Change(°C) | 6)αBolt(in/in/°C) = 5.94E-06 = (Δ, bolt-(((Pt)*(L.bolt))/(α.bolt*E.bolt)))/(Δ.Temp*L.bolt) |
| PI | 50 | Init Bolt Preload(LBF) | |
| L.f | 0.600 | Frame Thickness | Stress Bolt(psi) = 4065   (Pt+PI)/α.bolt |

2.36 = 6cm = Pathlength
*USING: Top Plate=316SS(2); Frame=Zerodur(3); PZT = PZT-5H(4)
By tailoring the thickness (length) of the top plate, Kovar can be chosen as the bolt material (Room temp. values
for α): α.Kovar=5.94uin/in/°C; E=22,000,000psi(5)

FIGURE 6

CAVITY LENGTH CONTROL SQUEEZE TYPE

| VARIABLE | VALUE | DESCRIPTION | Equation Number |
|---|---|---|---|
| α.tp* | 1.5E-05 | α Top Plate(in/in/°C) | |
| L.tp | 0.2864 | Length Top Plate(in) | |
| α.pzt* | 4E-06 | α PZT(in/in/°C) | |
| L.pzt | 0.120 | Length PZT (in) | |
| α.f | 0.268 | Area Frame(in^2) | |
| L.bolt | 1.1264 | Length Bolt(in) | |
| E.f | 950000 | Frame Modulus(psi) | 1)Thermal Reaction(Lbf) = Pt=-25.04=((α.f*Δ.Temp*PL*α.f*E.f)/(L.f*PR)) |
| α.f* | -1E-07 | α Frame(in/in/°C) | |
| PL | 2.36 | Gyro Pathlength(in) | 2)tp(in) = 0.000217=((-(Pt)*L.tp)/(α.tp*E.tp))+α.tp*Δ.Temp*L.tp |
| PR* | 0.240 | Poisson Ratio-Frame | |
| α.tp | 0.268 | Area Top Plate(in^2) | 3)f(in) = 5.54E-05 = (α.f*Δ.Temp*L.f)-((Pt)*(L.f))/(α.f*E.f) |
| α.pzt | 0.268 | Area PZT(in^2) | |
| α.bolt | 0.01227 | Area Bolt(in^2) | 4)pzt(in) = 4.69E-05 = (2*α.pzt*Δ.Temp*L.pzt)-(((Pt)*(L.pzt))/(α.pzt*E.pzt)) |
| E.bolt | 2.2E+07 | Bolt Modulus(psi) | |
| E.pzt | 1E+07 | PZT Modulus(psi) | 5)bolt(in) = 0.000319 = Δ.tp+Δ.f+Δ.pzt |
| E.tp* | 2.8E+07 | Top Plate Modulus | |
| Δ.Temp | 50 | Temp. Change(°C) | 6)αBolt(in/in/°C) = 3.82E-06 = (Δ,bolt-(((Pt)*(L.bolt))/(α.bolt*E.bolt)))/(Δ.Temp*L.bolt) |
| PI | 50 | Init Bolt Preload(LBF) | |
| L.f | 0.60 | Frame Thickness | Stress Bolt(psi) = 2035 |

2.36 = 6cm = Pathlength
*USING: Top Plate=316SS; Frame=Zerodur; PZT=PZT-5H
Kovar (-30°C Values for α are actually 4.6uin/in/°C): 4.6-3.8=0.8uin/in/°C=-1.uin residual PZT strain compensation (α*L.bolt).

FIGURE 7

| VARIABLE | VALUE | DESCRIPTION | CAVITY LENGTH CONTROL SQUEEZE TYPE |
|---|---|---|---|
| | | | Equation |
| $\alpha.tp^*$ | 1.5E-05 | $\alpha$ Top Plate(in/in/°C) | Number |
| L.tp | 0.2864 | Length Top Plate(in) | |
| $\alpha.pzt^*$ | 3E-06 | $\alpha$ PZT(in/in/°C) | |
| L.pzt | 0.120 | Length PZT(in) | |
| $\alpha.f$ | 0.268 | Area Frame(in^2) | |
| L.bolt | 1.1264 | Length Bolt(in) | |
| E.f | 950000 | FrameModulus(psi) | 1)Thermal Reaction(Lbf) = 20.86 = $-((\alpha.f^*\Delta.Temp^*PL^*\alpha.f^*E.f)/(L.f^*PR))$ |
| $\alpha.f^*$ | -1E-07 | $\alpha$ Frame(in/in/°C) | |
| PL | 2.36 | Gyro Pathlength(in) | 2)tp(in) = 0.000224 = $((-(Pt)^*L.tp)/(\alpha.tp^*E.tp))+\alpha.tp^*\Delta.Temp^*L.tp$ |
| PR* | 0.240 | Poisson Ratio-Frame | |
| $\alpha.tp$ | 0.268 | Area Top Plate(in^2) | 3)f(in) = -0.00017 = $(\alpha.f^*\Delta.Temp^*L.f)-((Pt)^*(L.f))/(\alpha.f^*E.f)$ |
| $\alpha.pzt$ | 0.268 | Area PZT(in^2) | |
| $\alpha.bolt$ | 0.01227 | Area Bolt(in^2) | 4)pzt(in) = 3.51E-05 = $(2^*\alpha.pzt^*\Delta.Temp^*L.pzt)-(((Pt)^*(L.pzt))/(\alpha.pzt^*E.pzt))$ |
| E.bolt | 2.2E+07 | Bolt Modulus(psi) | |
| E.pzt | 1E+07 | PZT Modulus(psi) | 5)bolt(in) = 8.91E-05 = $\Delta.tp+\Delta.f+\Delta.pzt$ |
| E.tp* | 2.8E+07 | Top Plate Modulus | |
| $\Delta.Temp$ | 50 | Temp. Change(°C) | 6)$\alpha$Bolt(in/in/°C) = 3.619E-08 = $(\Delta.bolt-(((Pt)^*(L.bolt))/(\alpha.bolt^*E.bolt)))/(\Delta.Temp^*L.bolt)$ |
| Pl | 50 | Init Bolt Preload(LBF) | |
| L.f | 0.6 | Frame Thickness | Stress Bolt(psi) = 5775 |

2.36 = 6cm = Pathlength
*USING: Top Plate=316SS; Frame=Zerodur; PZT=PZT-5H
Kovar (+70°C Values for $\alpha$ are actually 6.2uin/in/°C): 6.2-.03 = 5.9uin/in/°C(1.12*5.9 = 6.2uin residual PZT strain compensation)

RING LASER GYRO CAVITY LENGTH CONTROLLER, FRAME COMPRESSION

BACKGROUND OF THE INVENTION

1. Field of the Invention

The present invention relates to ring laser gyroscopes and more particularly, to an improved cavity length controller for a ring laser gyroscope.

2. Description of the Prior Art

A ring laser gyroscope (RLG) is a gyroscope which utilizes a laser beam directed to travel in a closed path to detect rotation about the axis of the path around which the laser beam is directed. The ring laser gyroscope must be capable of operating over a wide range of temperatures. Because of temperature variations, the material which the gyroscope is made of experiences thermal expansion and contraction. The laser beam within the ring laser gyroscope is directed in its path by means of mirrors, however, temperature variations cause a change in the path length. This change in path length, if not corrected, can result in drift and scale factor changes.

U S. Pat. No. 4,386,853 to Ljung discloses a bending actuator for a ring laser gyroscope. This invention corrects bias errors caused by frame distortion by bending the ring laser gyroscope block in an asymetric fashion. The present invention however utilizes symetrically applied force to keep the path length of the laser frame constant during temperature excursions. The concept of the present invention becomes more important as the size of ring laser gyros decrease, which has been the trend over the last decade. U.S. Pat. No. 4,561,780 to Ljung et al pertains to path length control as necessary to prevent the starting of the ring laser gyroscope at a point in-between axial modes. This is a more conventional type of path length control. U.S. Pat. No. , 4,715,713 to Hutchings discloses a path length adjuster for a ring laser gyro. This invention seeks to strain the laser frame symetrically from the inside of a flexure bore to maintain cavity length. This approach works well for large ring laser gyros that can tolerate a large hole in the center of the frame. The present invention describes a method whereby the frame is strained symetrically from top to bottom through a bolt diameter for smaller ring laser gyros. The present invention relies on laser frame machining symmetry, and can work with ring laser gyros of the smallest size. The Hutchings disclosure can not be applied to laser frames much smaller than 20 cm in path length.

Besides the above, ring laser gyro technology has utilized deformable mirrors and mirror actuators to control path length variations caused by thermal expansion. The requirement exists for a smaller, low cost ring laser gyro and it is not practical or economical to implement a deformable mirror and a mirror actuator of such small dimensions (0.25 in. typical) on such a gyro. Because of all of the above, a new path length control concept is required which will precisely control ring laser gyro pathlength while also reducing cost, parts count and assembly time.

SUMMARY OF THE INVENTION

The present invention controls the length of a cavity in a ring laser gyro by applying a force to the gyro normal to the lasing plane in order to maintain the cavity length constant over a given temperature range. This is accomplished by inserting a bolt through the longitudinal axis of the gyro, to apply or to relieve a force to maintain the laser cavity length constant.

BRIEF DESCRIPTION OF THE DRAWINGS

FIG. 5 illustrates how the thermal coefficient of expansion (TCE) for a bolt is determined.

FIG. 6 illustrates piezoelectric strain compensation at $-30°$ C.

FIG. 7 illustrates piezoelectric strain compensation at $+70°$ C.

DETAILED DESCRIPTION OF THE INVENTION

Figure 1:
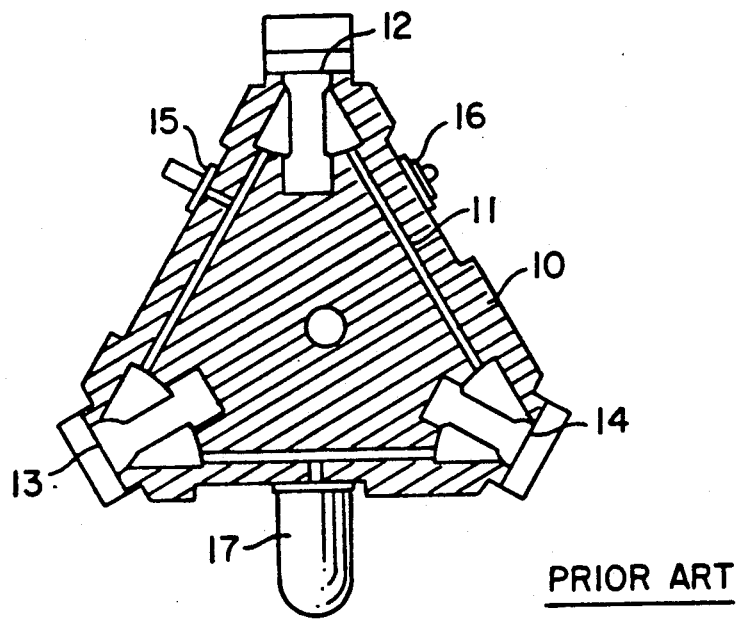
FIG. 1 illustrates a typical prior art, ring laser gyroscope.

FIG. 1 illustrate a typical prior art ring laser gyroscope of the type discussed above. The block of the ring laser gyroscope can be in a variety of shapes, such as square, rectangular, etc. and can be made out of a variety of materials. For our discussion the ring laser gyroscope will comprise a triangular block 10 which is formed of a glass ceramic or a stable quartz. A cavity 11 representing a ring laser path is formed in the triangular block and is defined by two highly reflective mirrors 12 and 13 and an output mirror 14. The cavity 11 is sealed and contains a mixture of helium and neon gases. The ring laser gyroscope also includes two anodes 15 and 16 and a cathode 17. A plasma discharge between the two anodes 15, 16 and the cathode 17 provides the necessary gain in the gas filled chamber. Two monochromatic light beams are directed by the mirrors around the block 10 in clockwise and counter clockwise directions respectively. The entire ring laser gyroscope may be supported upon a post on a supporting vehicle or laboratory bench.

Figure 2:
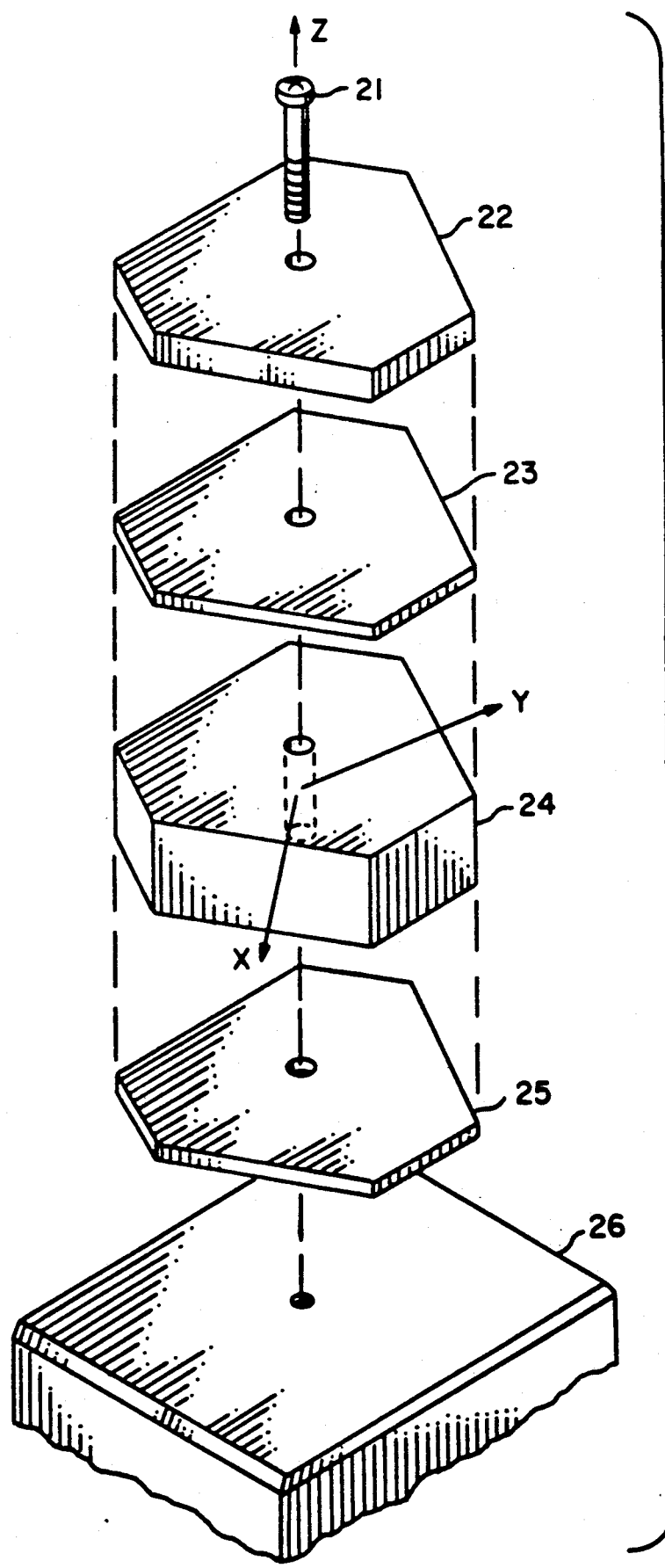
FIG. 2 is an exploded perspective of a ring laser gyroscope constructed in accordance with the present invention.

FIG. 2 illustrates the assembly configuration of the present invention which counteracts thermal expansion or contraction of the ring laser gyro cavity. As discussed earlier, it should be recognized by those skilled in the art that a gyroscope can be made in a variety of shapes, such as square, rectangular, etc. and can be made out of a variety of materials. The present invention is applicable to any gyroscope having a closed-loop path in addition to the triangular shaped frame and path of FIGS. 1 and 2. The number of mirrors employed is dependent on the shape or configuration selected.

From FIG. 2, the ring laser gyro cavity length controller design comprises a bolt 21, top plate 22, two piezoelectric elements 23 and 25 and a ring laser gyro frame 24. In this embodiment, the ring laser gyro assembly is mounted on an inertial sensor assembly (ISA) housing 26. When designing an ISA housing for this application, the use of a thermally insulated threaded bushing and piezoelectric interface will help alleviate conductive heat transfer and allow primarily convection and radiation. In other embodiments, the ring laser gyro may be mounted to a test fixture etc... and a plate or dither drive motor may be used to secure the bolt. Throughout any given temperature range the piezoelectric elements 23, 25, top plate 22, frame 24, and bolt 21 expand or contract to passively apply the required force or relieved force so that laser cavity path length remains constant. The laser cavity is a regular polygon, and if the ring laser gyro frame is substantially symmetrical, once initial adjustments are made, temperature and stress affects should be substantially the same for each branch, and so long as the forces are also symmetrically positioned, the control signals applied to the forces may be substantially identical.

Figure 3:
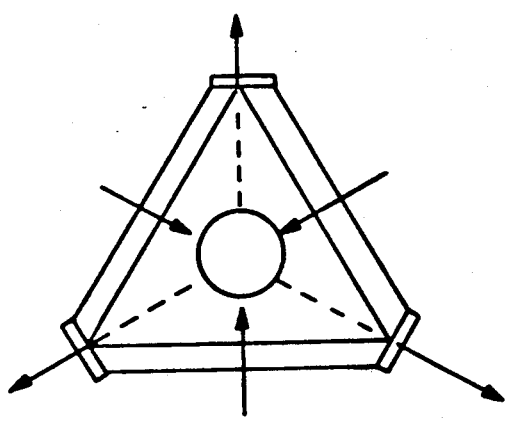
FIG. 3 and 4 illustrate the inward and outward forces related to a ring laser gyro frame.
Figure 4:
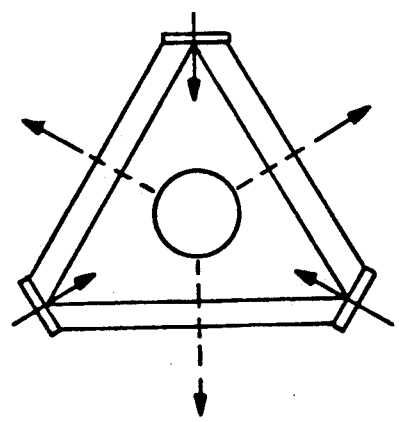

FIGS. 3 and 4 illustrate two sets of forces that operate in opposition or push pull to alter the laser frame. The forces are directed either outwardly as in FIG. 3 or inwardly as in FIG. 4 and the forces centered on the ring laser gyro frame sides are directed perpendicular to the sides and substantially at their center between their corners. These forces are in an opposite direction to the forces directed at the corners and these forces correspond to the X, Y and Z coordinate forces illustrated in FIG. 2.

Returning now to FIG. 2, when the ring laser gyro cavity length controller is assembled, preloading the bolt 21 is required in correlation with the forces illustrated in FIGS. 3 and 4, to operate the ring laser gyro at gain center (keeping the actual pathlength exactly equal to n wavelengths). The frame 24 is expanded initially at room temperature. This initially stresses all components of the assembly by the initial bolt preload (PI) divided by the area of load distribution. As the temperature changes, additional force or decreased force is required in the Z direction to keep the pathlength constant in the X and Y directions. This force is defined by the following equation.

1. Thermal reaction force $$(Pt) = ((\alpha f)(\Delta T)(PL)(Af)(Ef))/((Lf)(PR))$$

where:
$\alpha f$ = Alfa frame (in/in/°C.)
$\Delta T$ = temperature change (°C.)
PL = gyro path length (in)
Af = area frame (in$^2$)
Ef = frame modulus (psi)
Lf = frame thickness (in)
PR = Poisson's ratio of frame Through temperature cycling, the ring laser gyro (RLG) assembly will expand or contract. The thermal coefficient of expansion of the RLG assembly can be matched to counteract the expansion of the bolt 21. Any residual mismatch can be compensated by utilizing the piezoelectric elements 23, 25.

To achieve the desired force at any given temperature, the required thermal reaction force (Pt) and the thermal expansion of the top plate 22, frame 24 and piezoelectric elements 23, 25 must be summed up and equated to the thermal expansion of the bolt 21. This is described by the following equations.

$$\delta tp = -((Pt)(Ltp))/((Atp)(Etp)) + \alpha tp\,(\Delta T)(Ltp) \qquad 2$$

$$\delta f = (\alpha f)(\Delta T)(Lf) - ((Pt)(Lf))/((Af)(Ef)) \qquad 3$$

$$\delta pzt = 2(\alpha pzt)(\Delta T)(Lpzt) - (((Pt)(Lpzt))/((Apzt)(Epzt))) \qquad 4$$

$$\delta b = \delta tp + \delta f + \delta pzt \qquad 5$$

$$\alpha b = (\delta b - ((Pt)(Lb))/((Ab)(Eb)))/((\Delta T)(Lb)) \qquad 6$$

where (besides the variables listed above):
$\delta tp$ = change in top plate (in)
Atp = area top plate (in$^2$)
Ltp = length (thickness) top plate (in)
Etp = top plate modulus (psi)
$\alpha tp$ = Alfa top plate (in/in/°C.)
$\delta f$ = change in frame (in)
$\delta pzt$ = change in pzt (in)
Apzt = area pzt (in$^2$)
$\alpha pzt$ = Alfa pzt (in/in/°C.)
Lpzt = length Pzt (in) each
Epzt = pzt modulus (psi)
$\delta b$ = change in bolt (in)
$\alpha b$ = Alfa bolt (in/in/°C.)
Lb = length bolt (in)
Eb = bolt modulus (psi)

All of the above equations have been formatted and the names and values of the variables have been tabulated in a spread sheet shown in FIG. 5. Also illustrated in the example of FIG. 5 is that by inserting known material properties for a ring laser gyro frame 24, top plate 22, and piezoelectric elements 23, 25, into the above equations, and also by constraining geometries, such as pathlength and areas, the thickness of the top plate 22 can be designed so that the thermal coefficient of expansion (TCE) exactly matches the displacement and force required to keep the ring laser gyro pathlength constant for any given temperature. The example illustrated in FIG. 5 is of a ring laser gyro having a path length of 6 cm and operating at room temperature.

As stated above accurate pathlength control is necessary (approximately 0.25 μin.) to reduce scale factor and bias errors. Variations in any of the RLG components' thermal coefficient of expansion (TCE) throughout the temperature range can be compensated by straining the piezoelectric elements 23, 25 shown in FIG. 2. The example in FIG. 6 illustrates the resulting effective change in bolt TCE when −30° C. TCE values are substituted for top plate 22, piezoelectric elements 23, 25 and frame 24. The result exhibits a −1.0 μin. residual deformation. In the example in FIG. 7 the same was done for TCE values at +70° C. and the residual deformation is +6.2 μin. Therefore, from the above examples which include a full range of temperatures, a worst case of ±6.2 μin. total range must be compensated for by piezoelectric strain.

The following equations show that it is possible to obtain a calculated maximum permissible strain/deformation range of ±11.1 μin. for the piezoelectric material used in the above embodiment. The ±11.1 μin. would allow for more than adequate temperature range pathlength control since the worst case in the above examples is ±6.2 μin.

To calculate the maximum allowable voltage (Vm) for the pzt of the above examples (Lpzt=0.120 in) we have the following equation.

$$\text{maximum allowable voltage } (Vm) = (Lpzt)(V/in.\ max) \qquad 7$$

$$(Vm) = \pm(0.120\ in.)(4000\ V/in.\ max)$$

$$(Vm) = \pm 480\ VDC$$

The maximum permissable strain/deformation range which for our calculations is ±11.1 μin. can be represented by the following equation.

$$\text{strain range} = \pm 11.1\ \mu in. = \Delta tpzt = \delta pzt(Vm)$$

$$\delta pzt = 2.313 \times 10^{-8} in/V \text{ (for PZT−5H)}$$

The maximum allowable compressive stress for the materials in the examples above is 2000 psi. The stress required to achieve a ±11.1 μin. strain range can be represented by the following equation.

$$\theta = P/A_{pzt} = 100/0.268\ in^2 = 350\ psi. \qquad 9$$

350 Psi is well within the range of maximum allowable compressive stress (2000 psi) therefore the above examples illustrate that it is possible to obtain a calculated maximum permissible strain/deformation range of ±11.1 μin.

It is not intended that this invention be limited to the hardware, or operational procedures shown disclosed. This invention includes all of the alterations and variations thereto as encompassed within the scope of the claims as follows.

We claim:

1. A ring laser gyro cavity length controller comprising:
    a ring laser gyro assembly having a closed laser cavity and a hole at a center of said ring laser gyro assembly;
    housing means mounted below said ring laser gyro assembly; and,
    bolt means mounted through said hole of said ring laser gyro assembly and secured to said housing means, said bolt means capable of applying and relieving a force to maintain a constant length of said closed laser cavity; wherein said ring laser gyro assembly comprises:
    a top plate of a ring laser gyro assembly, said top plate having a hole at its center;
    said first piezoelectric element mounted below said top plate, said first piezoelectric element having a hole at its center;
    a ring laser gyro frame mounted below said first piezoelectric element, said ring laser gyro frame having a hole at its center; and,
    a second piezoelectric element mounted below said ring laser gyro frame, said second piezoelectric element having a hole at its center.

2. A ring laser gyro cavity length controller as claimed in claim 1 wherein said ring laser gyro assembly comprises:
    a triangular top plate of a ring laser gyro assembly, said triangular top plate having a hole at its center;
    a first triangular piezoelectric element mounted below said triangular top plate, said first triangular piezoelectric element having a hole at its center;
    a triangular ring laser gyro frame mounted below said first triangular piezoelectric element, said triangular ring laser gyro frame having a hole at its center; and,
    a second triangular piezoelectric element mounted below said triangular ring laser gyro frame, said second triangular piezoelectric element having a hole at its center.

3. A ring laser gyro cavity length controller as claimed in claim 1 wherein said ring laser gyro assembly comprises:
    a square top plate of a ring laser gyro assembly, said square top plate having a hole at its center;
    a first square piezoelectric element mounted below said square top plate, said first square piezoelectric element having a hole at its center;
    a square ring laser gyro frame mounted below said first square piezoelectric element, said square ring laser gyro frame having a hole at its center; and,
    a second square piezoelectric element mounted below said square ring laser gyro frame, said second square piezoelectric element having a hole at its center.

4. A ring laser gyro cavity length controller as claimed in claim 1 wherein said housing means mounted below said ring laser gyro assembly comprises:
    a threaded hole at its center capable of securing said bolt means.

5. A ring laser gyro cavity length controller as claimed in claim 1 wherein said housing means mounted below said ring laser gyro assembly comprises:
    a thermally insulated threaded bushing mounted in a hole at its center, said thermally insulated threaded bushing capable of securing said bolt means.

6. A ring laser gyro cavity length controller as claimed in claim 1 wherein said housing means mounted below said ring laser gyro assembly comprises:
    a hole at its center; and,
    a plate mounted below said hole, said plate having a threaded hole which lies directly below said hole of said housing means, said plate capable of securing said bolt means.

7. A ring laser gyro cavity length controller as claimed in claim 1 wherein said housing means mounted below said ring laser gyro assembly comprises:
    a hole at its center; and,
    a dither drive motor mounted below said hole, said dither drive motor having a threaded hole which lies directly below said hole of said housing means, said dither drive motor capable of securing said bolt means.

* * * * *